H. V. LINDERMAN.
METHOD OF MANUFACTURING RAIL BONDS.
APPLICATION FILED APR. 19, 1921.
1,426,397. Patented Aug. 22, 1922.
Fig. 2.   Fig. 1.
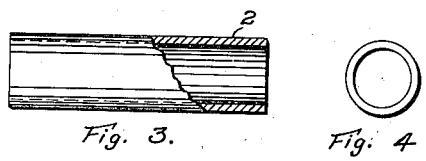
Fig. 3.   Fig. 4.
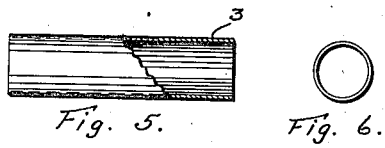
Fig. 5.   Fig. 6.
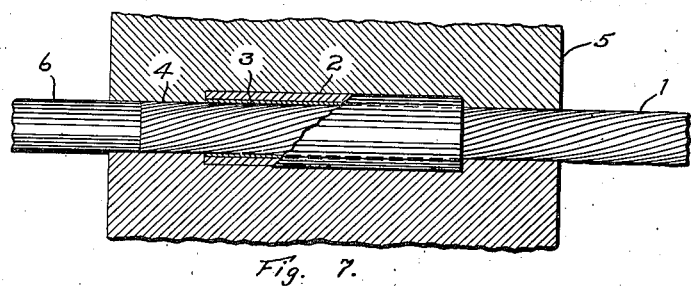
Fig. 7.
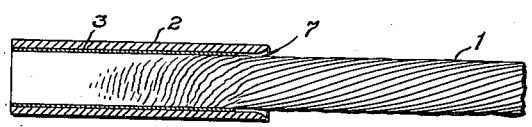
Fig. 8.
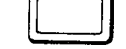 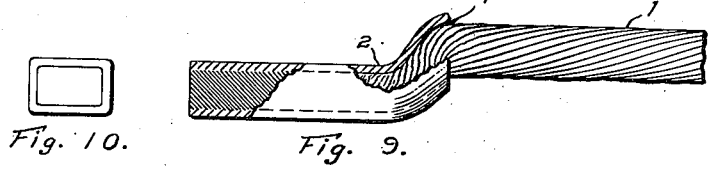
Fig. 10.   Fig. 9.
Inventor
Harry V. Linderman.
Witness
H. J. Stromberger.
By
Attorney

UNITED STATES PATENT OFFICE.

HARRY V. LINDERMAN, OF MANSFIELD, OHIO.

METHOD OF MANUFACTURING RAIL BONDS.

1,426,397.

Specification of Letters Patent. Patented Aug. 22, 1922.

Application filed April 19, 1921. Serial No. 462,755.

*To all whom it may concern:*

Be it known that I, HARRY V. LINDERMAN, a citizen of the United States, residing at Mansfield, in the county of Richland and State of Ohio, have invented certain new and useful Improvements in Methods of Manufacturing Rail Bonds, of which the following is a specification.

My invention relates to the method of uniting two dissimilar metals and particularly such metals as steel or iron and copper as used in the manufacture of rail bonds and particularly where the copper member is composed of a plurality of elements having air space therebetween.

My invention has for its object the assembly and manipulating of parts in such a manner as to exclude all air possible from the surfaces to be united and to compact the stranded portion such that in the final product it will be practically solid and homogeneous.

To practically set forth my invention I have herein described its application to the manufacture of a rail bond and have illustrated the various steps in the appended drawing in which:—

Fig. 1 shows a stranded body preferably of copper and cut to length.

Fig. 2 is an end view of Fig. 1.

Fig. 3 is a view in partial section of a steel or iron sleeve.

Fig. 4 is an end view of Fig. 3.

Fig. 5 is a view in partial section of a sleeve interposed between the members shown in Figs. 1 and 3.

Fig. 6 is an end view of Fig. 5.

Fig. 7 is a view in partial section of the parts in an assembled relation and positioned in a die for compressing.

Fig. 8 is a sectional view of the assembled parts after the projecting part of Fig. 1 has been upset and compacted within the steel sleeve.

Fig. 9 is a view of a finished bond terminal after heating and further compacting to unite the parts to form an integral construction.

Fig. 10 is an end view of the left hand face of Fig. 9.

In constructing a rail bond within the scope of my invention I first prepare a body member cut to proper length and from stranded material, preferably copper. I then prepare a casing 2 of steel or iron tubing of proper length and interior area to receive the end of the cable 1. I then prepare a sleeve 3 of thin material to interpose between the members 1 and 2 to unite them together and this sleeve is preferably of brass or other material having a lower melting point than the other parts and which will unite with steel or iron and copper. These parts are assembled as shown in Fig. 7 with the end 4 of the body 1 projecting a predetermined distance outside the end of the sleeve 2. These assembled parts are then placed in a die 5 of proper construction and caused to grip the member 1 and sleeve 2 in such a manner as to hold them in a fixed relation to each other. A plunger 6 is then brought into engagement with the end 4 of the body 1 projecting beyond the sleeve 2 and as the plunger is moved forward it forces and crowds the part 4 into the sleeve 2 thereby compacting and compressing the body 1 into a practically solid mass as per Fig. 8 and at the same time excluding the air from between the strands forming the body 1 and from between the body and sleeve 3 and between the sleeve 2 and sleeve 3. The exclusion of the air is a very important factor I find in making a secure and reliable union between the parts as it prevents the oxidation of the parts when subjected to heat. Copper and iron oxidize readily when subjected to heat in the presence of air. The parts are now subjected to heat and brought up to a temperature preferably in excess of the melting point of the sleeve 3, although I have found that a temperature somewhat lower than the theoretical melting point of the sleeve 3 will produce results when the parts are strongly compressed under a drop hammer when in such heated condition. When the parts have been brought up to the proper heat I place the assembled bond end in a properly constructed die and apply a compression to the parts to form them into the shape required, to further compact the parts and to unite the parts firmly together.

The herein described process differs from that set forth in my recently issued Patent 1,369,927 dated March first 1921 in that the compacting of the strands in the body member is made before the parts are assembled, while in my present application I compact the strands within the casing, thereby securing a much better condition under which to unite the parts as I am able to exclude the air from all parts.

There is another advantage which my present method possesses over that set forth in my above patent and that is that the cable 1 at the inner end 7 is not squeezed and pressed out of shape or to a degree which is serious to the individual strands as I find that when crowding the cable up from the opposite end that the compression and compaction is greatest at the outer end and gradually diminishes towards the end 7 at which point the strands making up the cable 1 maintain their original identity. Also the sleeve 3 does not extend entirely to the inner end thereby avoiding any union between the cable 1 and sleeve 2 at the point 7 and permitting freedom of mount at this point in the finished product.

Many variations will suggest themselves to those skilled in the art but I do not wish to be limited except as by the following claims:—

1. The method of forming an article of manufacture comprising the steps of inserting the end of a copper body composed of a plurality of units within a ferrous casing with an interposed layer of brazing metal and permitting the end of the copper body to project beyond the outer end of the ferrous casing, then gripping the parts in a die to hold the casing, body and brazing metal relative to each other, then compacting the body within the casing by crowding the projecting portion of the body into the casing thereby excluding the air from the interior of the casing and body, then heating the parts to a temperature at least equal to the melting point of the brazing metal and then subjecting the heated parts to pressure from without to compact, unite and shape the same.

2. The method of forming an article of manfacture comprising the steps of inserting the stranded end of a cable within a ferrous casing with an interposed layer of brazing material and permitting the end of the cable to project through and beyond the end of the casing, then crowding the projecting end of the cable into the casing to compact the strands, bring all parts into intimate contact and exclude the air therefrom, then heating the parts and subjecting them to pressure from without to further compact, unite and shape the same.

3. The method of forming an article of manufacture comprising the steps of inserting the stranded end of a cable within a ferrous casing having interposed brazing metal therebetween, then bringing endwise pressure upon the cable to compact and compress the same within the casing and force it out into intimate engagement with the surrounding parts, to exclude the air from between the parts, then heating the parts and bringing pressure thereupon from without to further compact, compress, unite and shape the parts.

4. A method of forming an article of manufacture comprising the steps of surrounding the end of a conductor with a casing and having interposed brazing material therebetween, then compressing and expanding the conductor within the casing to force it and the surrounding parts into intimate contact with each other, then heating the parts and while heated subjecting them to further pressure to compress, unite and shape the parts.

5. A method of forming a rail bond comprising the steps of inserting a cable within a casing with interposed brazing metal therebetween for a portion of the length of the casing, then compressing and expanding the cable within the casing by forcing the cable into the casing from one end, force it and the surrounding aforesaid named parts into intimate contact to exclude the air, the said compacting and expanding being greatest at one end of the casing and diminishing toward the opposite end; then heating the parts, and then subjecting the parts to further pressure to compress and shape the same and unite them along the area occupied by the brazing metal.

6. The method of forming a rail bond comprising the steps of inserting a cable within a casing with interposed brazing metal therebetween, then compressing and expanding the cable within the casing to force it and the surrounding parts into intimate contact to exclude the air by compressing the cable from one end, the said compacting and expanding being greatest at one end of the casing and diminishing toward the opposite end; then heating the parts, and then subjecting the parts to further pressure to compress, shape and unite them.

7. The method of forming an article of manufacture comprising the steps of inserting the stranded end of a cable within a ferrous casing having interposed brazing metal therebetween, then bringing pressure upon the cable to compact and compress the same within the casing while the parts are cold and thereby forcing the cable into intimate engagement with the surrounding parts, to exclude the air from between the parts, then heating the parts and bringing pressure thereupon from without to further compact, compress, unite and shape the parts.

8. A method of forming a rail bond comprising the steps of surrounding the end of a conductor with a casing, but leaving the end face exposed, then compressing and expanding the conductor within the casing to force it and the surrounding parts into intimate contact by compressing the conductor from one end, then heating the parts and bringing pressure thereupon from without to further compact, compress, unite and shape the parts.

In testimony whereof I affix my signature.
HARRY V. LINDERMAN.